Nov. 5, 1963  F. L. MALTBY  3,109,882
INSULATING MEANS FOR CONCENTRIC CONDUCTOR ELEMENTS
Filed May 9, 1960
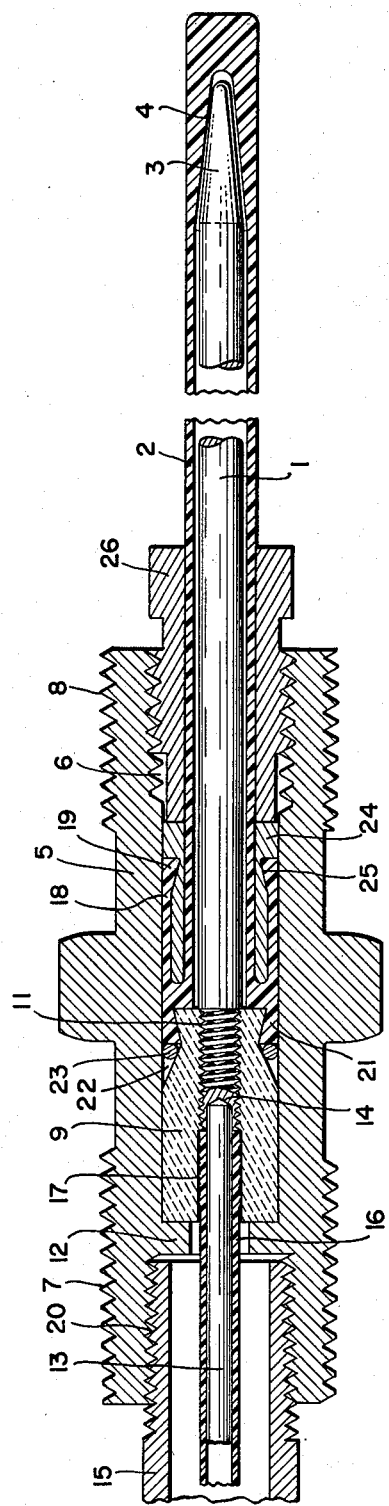
INVENTOR.
FREDERICK L. MALTBY
BY
ATTORNEY.

United States Patent Office 3,109,882
Patented Nov. 5, 1963

3,109,882
INSULATING MEANS FOR CONCENTRIC
CONDUCTOR ELEMENTS
Frederick L. Maltby, 1417 Edge Hill Road,
Abington, Pa.
Filed May 9, 1960, Ser. No. 27,762
10 Claims. (Cl. 174—151)

The present invention generally relates to means for insulating electrical elements. More particularly, the present invention is concerned with means for providing an insulating hermetic seal between concentric conductive members across which a potential may exist.

An object of the present invention is to provide an insulating seal of the type described which is adapted to withstand high temperatures and high pressures under corrosive conditions.

While not limited thereto the present invention is particularly adapted for insulating and protecting capacity probes of the type utilized in measuring liquid level and liquid interfaces in industrial processes. In such an application, the capacity probe, which is generally an insulated rod, is inserted into the product being monitored and acts as one plate of a capacitor. The wall of the product vessel is generally the ground plate of the same capacitor and the air or the product within the vessel acts as the dielectric material between the two plates. In operation, changes in product level change the probe capacitance since the dielectric constant of air is one and the dielectric constant of all other liquid or granular materials is higher. This change in capacity can be utilized to detect and measure change in product level within the vessel.

Since probes of the type described are utilized in chemical processes where they are subjected to caustic and corrosive environment as well as high temperatures and high pressures, it is necessary to insulate the probe with material which will protect it from chemical attack. For this purpose, the chemical resistant properties of thermoplastic resins, such as tetrafluoroethylene are ideally suited. However, plastic materials of this nature are subject to cold flow under pressure as well as dimensional change with changes in temperature and thus it becomes difficult to maintain an hermetic seal between the probe and its mounting gland under the extreme conditions of temperature and pressure to which such probes are subjected. Prior art capacity probe constructions have not been satisfactory in withstanding single or repeated exposure to extreme temperatures and pressures due to design features which place stress on the thermoplastic sheath used to protect and insulate the probe. In particular, they require repeated tightening to maintain any reasonable seal between the probe and its mounting gland due to the flow characteristics of the sheath material with temperature. In extreme cases such repeated tightening has resulted in cutting the sheath and in the loss of insulation. Anothr disadvantage to prior art capacity probe construction is the utilization of the plastic insulating and protective sheath as the primary supporting member of the probe in the mounting gland. This subjects the sheath to severe stress when under pressure and can also result in the cutting of the sheath and loss of insulation.

It is, therefore, another object of the present invention to provide a probe structure in which the insulating sheath is not primarily utilized to support the probe in the mounting gland.

It is still another object of the present invention to provide a sheath having a geometric configuration which will utilize the dimensional changes of the plastic insulating sheath with temperature so as to maintain an hermetic seal betwten the probe and its mounting gland even under extreme conditions.

It is still another object of the present invention to provide a capacity probe construction which will withstand repeated applications of high temperatures and high pressures and remain hermetically sealed.

In accordance with the present invention there is provided a new and improved probe construction in which the thermoplastic insulating sheath terminates in an elongated section which is reversed upon itself. The ends of the elongated reversed section are provided with inwardly tapering wedge shaped elements which are designed to wedge in the mounting glands upon shrinkage of the sheath material due to cooling and thereby maintain an hermetic seal between the mounting gland and the probe. To insure this wedging action the length of the reversed section is made such that the longitudinal shrinkage of the section is substantially greater than the lateral shrinkage of the wedge shaped elements. Means are also provided for supporting the probe in the probe mounting gland by an insulating member more readily adapted for the purpose than the sheath material and which does not need to be a corrosion resistant element in that it is not required to tolerate the corrosive conditions of the process.

A better understanding of the present invention may be had from the following description when read with reference to the accompanying drawing which is a sectional elevation of the capacity probe in accordance with the present invention.

Referring now to the drawing, the numeral 1 indicates a capacity probe which, as shown, is a metallic rod adapted to be inserted into a process product to act as one plate of a capacitor in a measuring system monitoring a process variable such as liquid level. To protect the probe 1 from corrosion and contamination by the process product, it is surrounded by an insulating sheath 2 which is also adapted to insulate the probe electrically from the process liquid and the probe mounting structure. The insulating sheath 2 is preferably made of a thermoplastic resin such as tetrafluoroethylene, which has high insulation resistance, extremely low moisture adsorption, low heat flowing and memory shrinkage characteristics upon cooling.

In order to prevent the probe 1 from cutting the insulating sheath 2 when the latter is extended as a result of growth with temperature, the end of the probe 1 is tapered to a blunt point 3. The tapered point 3 further facilitates re-entry of the probe into the insulating sheath 2 upon the cooling and shrinking of the sheath thereby minimizing tension which could rupture the sheath. As shown, the insulating sheath 2 is also tapered at 4 to substantially mate with the tapered point 3 of the probe 1.

The probe 1 is adapted to be mounted by means of a mounting gland 5 having a central bore 6 through which the probe 1 may pass and/or terminate. The mounting gland 5 may be made of stainless steel or other metal resistant to the corrosion attack of process environments. As shown, the mounting gland 5 is threaded at its ends 7 and 8 to facilitate its mounting in a process vessel.

The probe 1 is supported in the mounting gland 5 by a rigid insulating supporting member 9. To this end, the supporting member 9 has a threaded central bore 11 into which the probe 1 is screwed. As will be explained in more detail hereinafter, the supporting member 9 is isolated from the process environment by the insulating sheath 2 and the mounting gland 5, and hence it may be made from a material which does not have to have corrosion resistant properties. For this purpose, a rigid insulating ceramic material such as molded mica or vitreous aluminum oxide have been found to be suitable.

The supporting member 9 is adapted to be inserted into the central bore 6 of the mounting gland 5 from the right and to abut against a shoulder 12 extending inward from the bore 6. In the embodiment of the present invention shown in the drawing, the probe 1 terminates in the supporting member 9 and connection is made thereto by means of a suitable connecting member 13 also in the form of a rod, which is adapted to pass through the supporting member 9 from the left and to make electrical contact with the probe 1 at 14. As shown, connecting member 13 passes through a suitable protecting conduit 15 which threads into the lower bore 20 of the mounting gland 5. To insulate the connecting member 13 from the conduit 15 and the collar 12, it is surrounded with an insulating sheath 16 which extends into the supporting member 9. The insulating sheath 16, like the sheath 2, may be made of a suitable thermoplastic resin such as tetrafluoroethylene. As shown, the sheath 16 is provided with a plurality of circumferential ribs 17 which have substantially sawtooth cross sections and which are adapted to deform and provide a seal between the supporting member 9 and the sheath 16. To enhance the seal obtained between the sheath 16 and the supporting member 9 the latter may be coated with a tetrafluoroethylene emulsion in the area of contact with the sheath 16. This construction is designed to prevent condensate which might form and collect in the conduit 15 from creating a short circuit between the connecting member 13 and the probe supporting structure.

Whereas the probe 1 terminates in the supporting member 9, the protective sheath 2 is reversed upon itself at the supporting member 9 in such a manner as to provide an elongated reversed section 18 terminating in a circumferential wedge shaped section 19 and including a second circumferential wedge shaped section 21. As shown, the wedge shaped sections, 19 and 21 are tapered in opposite directions. The wedge shaped section 21 is adapted to mate with the righthand portion of the V-shaped recess 22 in the supporting member 9 and abut against a retaining ring 23 which fits around the supporting member 9 in the recess 22.

The ring 23 is adapted to be wedged between the recess 22 and the bore 6 by the end of the wedge shaped section 21. At extremely high pressures the retaining ring 23 is functional to prevent the flow of the wedge shaped section 21 between the supporting member 9 and the bore 6 since the pressure of the sheath material is directed against the ring causing it to seal off any flow passage.

A sleeve or pusher 24 is adapted to be inserted over the probe 1 and sheath 2 and be inserted between the sheath 2 and its reversed section 18. As shown the sleeve 24 has a circumferential wedge shaped recess 25 adapted to accommodate the wedge shaped section 19 on the reversed section 18 of the sheath 2. The probe 1, the sheath 2, the retaining ring 23 and the supporting member 9 are retained in the mounting gland 5 by means of a threaded collar 26 which fits over the probe 1 and sheath 2 and threads into the central bore 6 to abut against the end of the sleeve 24. As the collar 26 is tightened against the sleeve 24, the reversed section 18 of the sheath 2 is tightened and expanded against the inside of the bore 6 of the mounting gland 5 and tightened against the retaining ring 23 and insulating member 9 to provide a hermetic insulating seal designed to prevent process fluids from being forced under pressure between these components to contaminate and short circuit the probe 1 to its mounting structure.

The structure described above is specifically designed to provide a hermetic insulating seal between the probe 1 and its mounting structure which will be maintained even after repeated exposure to extreme high temperatures and pressures. To this end, the geometric configuration of the sheath 2 is designed to utilize the dimensional changes of the sheath material with temperatures to maintain the seal. As mentioned hereinbefore, thermoplastic resin such as tetrafluoroethylene expands considerably at high temperatures and contracts upon cooling. At a high temperature the sheath 2 will expand and the seal obtained will be even greater than that existing when the plastic is in the unexpanded state. Upon cooling after such expansion, however, the plastic tends to shrink which can permit process fluids to be forced between the sheath and the mounting gland 5 at high pressures. The reversed section 18 of the sheath 2 with the circumferential wedge shaped sections 19 and 21 are functional to maintain the seal upon the shrinkage of the sheath material. To this end, the length of the reversed section 18 between the wedge shaped sections 19 and 21 is made substantially longer than the greatest width of these wedge shaped sections. Because of this, the longitudinal shrinkage in the portion of the reversed section 18 between the wedge shaped sections is substantially greater than any lateral shrinkage in the wedge shaped themselves causing them to become wedged between the bore 6 of the mounting gland 5 and their respective wedge shaped recesses. This maintains the hermetic seal between these parts even upon repeated expansion and shrinkage of the sheath material with temperature.

To achieve a seal which will be maintained even under repeated applications of heat and pressure, means must be provided which will tighten the seal both on expansion and shrinkage of the sheath material. One or both of these means are lacking in prior art probe constructions. In the probe of the present invention the sheath material is restrained by the sleeve 24 and the supporting member 9 upon expansion causing it to conform precisely to the bore 6 and the recesses provided in the sleeve 24 and the supporting member 9 which results in an even tighter seal under such conditions. Restraint of the sheath material is also achieved under conditions which cause shrinkage of this material. In this respect, the wedge 19 also is operative to provide such action where the probe is subjected to an external pressure. While any externally applied pressure tends to force the sheath material into the restricted volume of bore 6 which of necessity tightens the seal, this action is complementary to the wedging action of the section 19 under the restraint provided by the sleeve 24 which holds the sheath at the fold where it reverses upon itself. The wedge shaped section 21 functions in event that the probe is subjected to a vacuum and leakage tends to be from the left end of the probe. Under these conditions the two wedges are tightened against each other by shrinkage of the intermediate sheath material and the seal is tightened.

As will be obvious to those skilled in the art, certain modifications may be made in the structure of the present invention as disclosed without departing from the spirit of the invention. For example, the assembly could be adapted for insertion in the mounting gland from the left with a restraining collar at the righthand end of the mounting gland. In this construction, a restraining collar would be inserted in the left and tightened against the structure disclosed. In addition, it should be noted that the sheath 2 may be made of materials other than tetrafluoroethylene having characteristics which will function in a similar manner.

Having described the present invention, that which is claimed as new is:

1. An insulating means for concentric conductor elements comprising an inner conductor element, an outer conductor element, a tubular insulating member of a heat flowable plastic subject to shrinkage on cooling surrounding said inner conductor element, a pair of oppositely tapered wedge shaped portions on said insulating member, the thickness of each of said wedge shaped portions decreasing in the direction of the opposite wedge shaped portion, said wedge shaped portions being separated from each other on said member by a distance substantially longer than the thickest dimension of said wedge shaped portion and means in said outer concentric conductor element mating with and restraining said wedge shaped portions of said insulating member, the linear shrinkage in said portions of said insulating member between said wedge shaped portions causing said portions to wedge against said mating means to maintain a liquid tight seal between said insulating member and said outer conductor element on cooling after heating.

2. An insulating means for a capacity probe having a concentric mounting gland comprising a tubular insulating sheath of a heat flowable plastic subject to shrinkage on cooling, said insulating sheath surrounding said probe, a pair of oppositely tapered wedge shaped portions on said insulating sheath, the thickness of each of said wedge shaped portions decreasing in the direction of the opposite wedge shaped portion, said wedge shaped portions being separated from each other by a distance substantially greater than the thickest dimensions of said wedge shaped portions and means in said concentric mounting gland mating with and restraining said wedge shaped portions from expansion upon heating of said insulating sheath, the linear shrinkage upon cooling of said sheath portion between said wedge shaped sections causing said wedge shaped sections to wedge in said mounting gland to form a liquid tight insulating seal.

3. Insulating means as specified in claim 2 wherein said wedge shaped portions are on a portion of said sheath that is reversed upon itself.

4. A capacity probe comprising a conductive rod, a tubular insulating sheath of a heat flowable plastic subject to shrinkage on cooling surrounding said rod, a concentric mounting gland for said rod, said insulating sheath being between said concentric mounting gland and said rod, said insulating sheath in said gland having oppositely tapered wedge shaped portions, the thickness of each of said wedge shaped portions decreasing in the direction of the opposite wedge shaped portion, the portion of said sheath between said wedge shaped portions being thinner in width than the greatest width of said wedge shaped portions, and means mating with said wedge shaped portions and said sheath, the linear shrinkage in said sheath between said wedge shaped portions being greater than the lateral shrinkage of said wedge shaped portions upon cooling of said sheath after heating causing said wedge shaped portions to wedge against said mating means to form a liquid tight seal between said mounting glands and said sheath.

5. A capacity type probe comprising, in combination, a rod shaped probe, a mounting gland for said probe, an insulating supporting member concentrically mounting said probe in said mounting gland and insulating it therefrom, an insulating sheath of heat deformable thermoplastic, said sheath surrounding said probe and reversing upon itself to form a reversed section in said mounting gland, said reversed portion terminating in a circumferential wedge shaped element, said reversed portion of said sheath being substantially longer than the greatest width of said wedge shaped terminating portion and thinner in width than the greatest width of said wedge shaped terminating portion, a sleeve inserted between said sheath and said reversed portion thereof, said sleeve having a wedge shaped recess mating with the wedge shaped portion of said reversed section and a collar threaded in said mounting gland around said sheath to abut against and hold said sleeve between said sheath and said reversed section of said sleeve to maintain a liquid tight seal between said sheath and said mounting gland.

6. A capacity probe comprising a conductive rod, a tubular insulating sheath of a heat flowable plastic subject to shrinkage on cooling surrounding said rod, a concentric mounting gland for said rod, a rigid insulating supporting member for said rod positioning said rod in said mounting gland, said insulating sheath being between said concentric mounting gland and said rod, said insulating sheath in said gland having oppositely tapered wedge shaped portions spaced from each other by a distance substantially longer than the greatest width of said wedge shaped portions, said sheath between said wedge shaped portions being thinner in width than the greatest width of said wedge shaped portions, and means mating with said wedge shaped portions of said sheath, the linear shrinkage in said sheath between said wedge shaped portions being greater than the lateral shrinkage of said wedge shaped portions upon cooling of said sheath after heating causing said wedge shaped portions to wedge against said mating means to form a liquid tight seal between said mounting gland and said sheath.

7. A capacity type probe comprising, in combination, an elongated probe member, a mounting gland for said probe member, an insulating supporting member concentrically mounting said probe member in said mounting gland and insulating it therefrom, an insulating sheath of heat deformable thermoplastic surrounding said probe member and terminating at said supporting insulating member and there reversing upon itself, said reversed portion having a circumferential wedge shaped portion at its end, said reversed portion of said sheath being substantially longer than the greatest width of said wedge shaped portion thereof and of a thickness less than the greatest width of said wedge shaped portion, a sleeve inserted between said sheath and said reversed portion thereof, said sleeve having a wedge shaped recess to mate with the wedge shaped portion of said reversed section and a collar threaded in said mounting gland around said sheath to hold said sleeve between said sleeve and said reversed portion and said terminal portion of said sheath against said insulating supporting member.

8. A capacity probe comprising, in combination, a rod shaped probe, a mounting gland for said probe, an insulating support concentrically mounting said probe in said mounting gland, an insulating sheath of thermoplastic resin surrounding said probe and terminating in said mounting gland at said insulating support and there reversing upon itself, said reversed portion terminating in a wedge shaped element, said reversed portion of said sheath being substantially longer than the greatest width of said wedge shaped terminating element and of a thickness less than the greatest width of said wedge shaped element, a sleeve inserted between said sheath and said reversed portion thereof, said sleeve having a recess for receiving said wedge shaped element and a collar threaded in said mounting gland for holding said sleeve and said terminal portion of said sheath against said insulating support to provide a liquid tight seal between said sheath and said mounting gland.

9. A capacity probe comprising, in combination, a rod shaped probe, a mounting gland for said probe, an insulating support concentrically positioning said probe in said mounting gland, an insulating thermoplastic sheath surrounding said probe and terminating in said mounting gland at said insulating support and there reversing upon itself, a pair of oppositely tapered wedge shaped portions on said reversed portion of said sheath, the thickness of each of said wedge shaped portions decreasing in the direction of the opposite wedge shaped portion, a sleeve inserted between said sheath and said reversed portion thereof, said sleeve having a tapered recess for receiving one of said wedge shaped portions, a tapered recess in said insulating support for receiving the other of said wedge shaped portions, and means threaded in said mounting gland for holding said structure therein.

10. A capacity probe as specified in claim 9 having an annular ring in the recess in said insulating support against which said other wedge shaped portion of said sheath abuts.

References Cited in the file of this patent
UNITED STATES PATENTS

| | | |
|---|---|---|
| 2,768,368 | Crane | Oct. 23, 1956 |
| 2,769,140 | Obenshain | Oct. 30, 1956 |
| 2,780,704 | Charbonneau | Feb. 5, 1957 |
| 2,945,914 | Aamodt | July 19, 1960 |
| 2,954,420 | Logan | Sept. 27, 1960 |